(No Model.)
J. G. & T. E. THOMPSON.
APPARATUS FOR TEACHING WORDS AND IDENTIFYING OBJECTS.
No. 569,846.  Patented Oct. 20, 1896.
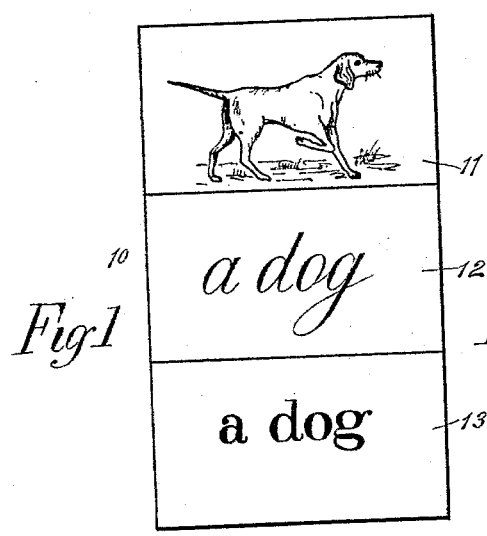
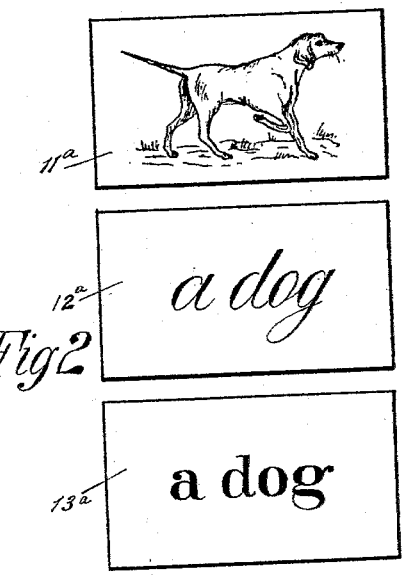
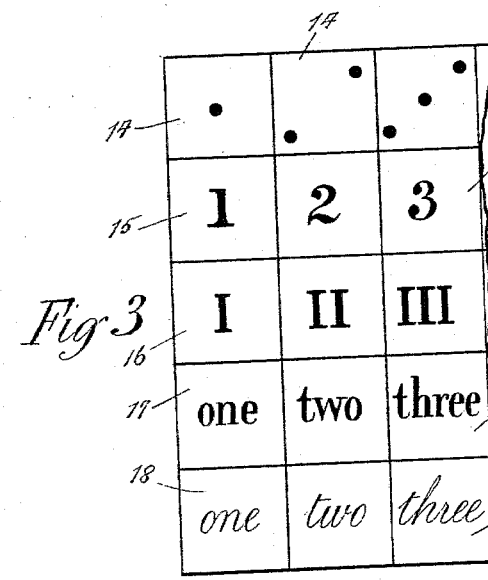
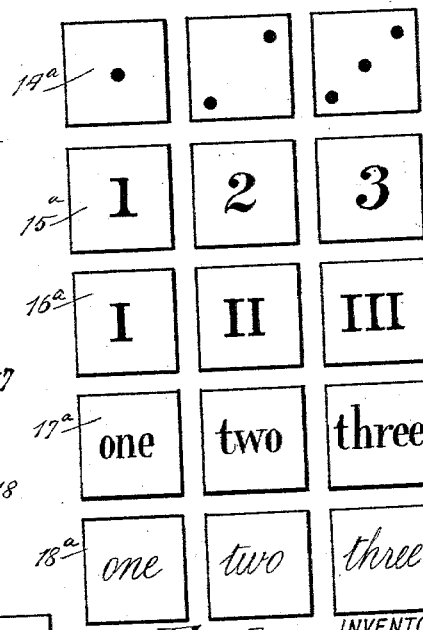
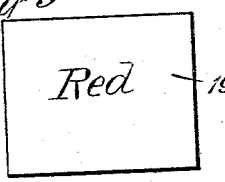
WITNESSES:
Bertram H. Saunders
Edward L. Conan
INVENTORS
Thomas E. Thompson
and John G. Thompson
BY
W. B. Hutchinson
ATTORNEY.

UNITED STATES PATENT OFFICE.

JOHN G. THOMPSON, OF LEOMINSTER, AND THOMAS E. THOMPSON, OF LAWRENCE, MASSACHUSETTS.

APPARATUS FOR TEACHING WORDS AND IDENTIFYING OBJECTS.

SPECIFICATION forming part of Letters Patent No. 569,846, dated October 20, 1896.

Application filed May 8, 1895. Serial No. 548,547. (No model.)

*To all whom it may concern:*

Be it known that we, JOHN G. THOMPSON, of Leominster, in the county of Worcester, and THOMAS E. THOMPSON, of Lawrence, in the county of Essex, State of Massachusetts, have invented certain new and useful Improvements in Apparatus for Teaching Words and Identifying Objects, of which the following is a full, clear, and exact description.

Our invention relates to improvements in primary methods of instruction; and the object of our invention is to produce a simple method and apparatus which is particularly adapted for the use of young pupils, which combines to instruct and entertain, thus keeping the pupil quiet while he is learning his lesson, which rapidly teaches the pupil to classify certain familiar objects, numbers, and colors, which also makes him familiar with the forms and characteristics of such objects, numbers, and colors, which teaches him further to quickly recognize the names of said objects, numbers, and colors and associate the names and objects, numbers, and colors together, even though the names appear in varying forms—as, for instance, in script, lower-case characters, and capitals—which is also adapted for teaching mathematics and color in a very elemental way, and which being made up in attractive forms has a tendency to cultivate the esthetic taste of the pupil.

To these ends our invention consists of an apparatus for teaching words and identifying certain objects, which apparatus will be hereinafter described and claimed.

Reference is to be had to the accompanying drawings, forming a part of this specification, in which similar figures refer to corresponding parts throughout the several views.

Figure 1 is a view of the complete slip or card having thereon an object and its name in different characters. Fig. 2 is a view illustrating a series of slips which when properly assembled correspond with the complete slip shown in Fig. 1. Fig. 3 is a broken view of the complete slip having a series of numbers arranged in varying forms thereon. Fig. 4 is a broken detailed view showing a series of squares which can be assembled to correspond with the complete slip shown in Fig. 3, and Fig. 5 is a diagram of a square or card used in teaching color.

In carrying out our invention we employ a slip or card 10, which may be of any suitable material and which is divided into a series of spaces 11, 12, and 13, one of which, preferably the upper one, contains the picture of some object, which, as illustrated, is a dog, but it may be any animal, building, number, color, or other thing, while in the spaces below it is the name of the object, number, or color, this name being produced, as shown in Fig. 1, in script and lower-case print, but it may be produced in still other forms, if desired.

For every complete slip 10 there is at least one series of independent slips $11^a$, $12^a$, and $13^a$, one bearing a representation of the object on slip 10 and the others having the name of the object thereon, and these separate slips, together with the complete slip and a series of other complete and independent slips representing an assortment of objects, are mingled together and given to the pupil.

The pupil lays out a complete slip with the object and its name in different forms thereon and then proceeds to properly assemble the independent slips, so as to duplicate the complete slip. In doing this he unconsciously associates in his mind the characteristics of the particular object which is absorbing his attention, while at the same time he associates with the object its name and the different characters of which the name may be compounded, and thus rapidly learns something of various objects, names of such objects, the appearance of both the names and objects, so that the names and the objects are intimately associated, and at the same time the pupil is kept quiet and amused.

Figs. 3 and 4 illustrate the same idea as Figs. 1 and 2, but in a slightly-different way, the slips and squares illustrated in Figs. 3 and 4 being especially adapted for teaching elemental mathematics. The complete slip 10 is in this case provided with spaces 14, containing each a certain number of dots or marks, while in the next space 15 below are Arabic figures, representing the dots, and in the next space 16 are Roman numerals, also representing the numbers of dots in another form, while still other spaces 17 and 18 contain the names of the numbers in print and script. It will be seen that this arrangement can be carried out to any necessary extent, that is, that the numbers may run from "1" to "5," "1" to "10," or to a greater or less extent, as desired.

A series of independent squares 14ª, 15ª, 16ª, 17ª, and 18ª have on them the dots, figures, numerals, and words, so that these latter independent squares when properly arranged correspond with the complete slip or card shown in Fig. 3, and thus the pupil gets familiar with the numbers and the various expressions of the same.

Instead of using particular objects and the names thereof, as, for instance, an animal and its name or a number of marks and the various other expressions of the number, the apparatus may be utilized for teaching colors, that is to say, a certain square, as 19, may be marked "Red" and may be of a red color, while another square of the same color will be unmarked, and squares or slips of other colors may be arranged in the same way, so that the child by matching up the marked and unmarked colors learns to distinguish the colors.

It will be clearly understood from the foregoing description that this method may be indefinitely carried out, objects in great variety being represented and named, so that the pupil gets a correct idea of a great quantity of varying things, and as the cards or slips can be made in attractive designs and handsome colors the pupil is entertained and also has cultivated to a certain extent his love for art.

Having thus fully described our invention, what we claim, and desire to secure by Letters Patent, is—

An apparatus of the kind described comprising a series of cards made up in pairs, one card of each pair being complete in itself and bearing thereon varying characterizations or expressions of a thing, said complete card being dissimilar from the other complete cards, and the second card of each series being made up of parts, each bearing thereon an expression or characterization corresponding to a part of the complete card, whereby the assembled parts of a card correspond exactly to the complete card, as set forth.

JOHN G. THOMPSON.
THOMAS E. THOMPSON.

Witnesses:
A. G. MORSE,
CHARLES A. JOSLIN.